(12) United States Patent
Golgiri et al.

(10) Patent No.: US 12,097,843 B2
(45) Date of Patent: Sep. 24, 2024

(54) REMOTE PARK ASSIST AUGMENTED REALITY USER ENGAGEMENT WITH CAMERALESS DETECTION

(71) Applicant: Ford Global Technologies, LLC, Dearborn, MI (US)

(72) Inventors: Hamid M. Golgiri, Livonia, MI (US); Vivekanandh Elangovan, Canton, MI (US); Tom Nelson, Plymouth, MI (US); Erick Michael Lovoie, Van Buren Charter Township, MI (US); Ryan Joseph Gorski, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 428 days.

(21) Appl. No.: 17/535,544

(22) Filed: Nov. 24, 2021

(65) Prior Publication Data

US 2023/0159019 A1    May 25, 2023

(51) Int. Cl.
*B60W 30/06*     (2006.01)
*B60W 50/10*     (2012.01)
(Continued)

(52) U.S. Cl.
CPC ............ *B60W 30/06* (2013.01); *B60W 50/10* (2013.01); *B60W 50/14* (2013.01); *G01S 19/39* (2013.01);
(Continued)

(58) Field of Classification Search
CPC ...... B60W 30/06; B60W 50/10; B60W 50/14; B60W 2050/146; B60W 2050/0064;
(Continued)

(56) References Cited

U.S. PATENT DOCUMENTS 10,627,811 B2   4/2020   Golgiri et al.
11,007,977 B2   5/2021   Golsch et al.
(Continued)

OTHER PUBLICATIONS

Phone as a Key, Huf Group, Modern authorization solution from the specialist, Aug. 2, 2021, 1-8.
(Continued)

*Primary Examiner* — Ian Jen
*Assistant Examiner* — Renee LaRose
(74) *Attorney, Agent, or Firm* — Frank Lollo; Eversheds Sutherland (US) LLP

(57) ABSTRACT

A system for a vehicle includes a vehicle processor disposed to control a drive system, and a memory for storing executable instructions. The vehicle processor is programmed to execute the instructions to determine, via the vehicle processor, a localization of a mobile device using a tethered wireless connection between the mobile device and the vehicle, receive, via the processor, an absolute heading of the mobile device, determine, via the vehicle processor, based on the localization of the mobile device, a relative bearing angle from the mobile device to the vehicle. The system may use the tethered wireless connection and the relative bearing angle from the mobile device to the vehicle to determine that a user is actuating a Human Machine Interface (HMI) element indicative of user attention to a remote parking maneuver and complete the remote parking maneuver.

20 Claims, 14 Drawing Sheets

(51) Int. Cl.
*B60W 50/14* (2020.01)
*G01S 19/39* (2010.01)
*G05D 1/00* (2024.01)

(52) U.S. Cl.
CPC ......... *G05D 1/0016* (2013.01); *G05D 1/0038* (2013.01); *B60W 2050/146* (2013.01)

(58) Field of Classification Search
CPC .. G05D 1/0016; G05D 1/0038; G05D 1/0033; G01S 5/0284; G01S 2205/01
See application file for complete search history.

(56) References Cited

U.S. PATENT DOCUMENTS

| | | | |
|---|---|---|---|
| 11,039,276 B2 | 6/2021 | Smith et al. | |
| 2006/0206244 A1* | 9/2006 | Arvidsson | G05D 1/0033 |
| | | | 701/1 |
| 2019/0220001 A1* | 7/2019 | Lavoie | G05D 1/005 |
| 2020/0307555 A1 | 10/2020 | Van Wiemeersch et al. | |
| 2020/0310412 A1* | 10/2020 | Noguchi | G05D 1/0016 |
| 2023/0185298 A1* | 6/2023 | Boehm | G06V 20/56 |
| | | | 701/2 |

OTHER PUBLICATIONS

BW Online Bureau, Continental gets new orders for Smartphone-based car keys, BW Auto World, Jun. 2020, 1-2.
Realtime safety with UWB, Volkswagen Newsroom, Wolfsburg (Germany), Oct. 15, 2019, 1-9.

* cited by examiner

REMOTE PARK ASSIST AUGMENTED REALITY USER ENGAGEMENT WITH CAMERALESS DETECTION

BACKGROUND

Some Level 2 (L2) Autonomous Vehicle (AV) Remote Driver Assist Technologies (ReDAT) such as Remote Park Assist (RePA) and Remote Trailer Hitch Assist (ReTHA) are required to have the remote device tethered to the vehicle such that vehicle motion is only possible when the remote device is within a particular distance from the vehicle. In some international regions, the requirement is less than or equal to 6 m. Due to limited localization accuracy with existing wireless technology in most mobile devices used today, the conventional applications require a user to carry a key-fob which can be localized with sufficient accuracy to maintain this 6 m tether boundary function. Future mobile devices may allow use of a smartphone or other connected user devices when improved localization technologies are more commonly integrated in the mobile device. Communication technologies that can provide such ability include Ultra-Wide Band (UWB) and Bluetooth Low Energy® BLE time-of-flight (ToF) and/or BLE Phasing.

Augmented Reality (AR) user engagement system generally determines and/or detects that the user is pointing the back of their mobile device towards the vehicle (e.g., where the mobile device has a relative bearing at or close to 0° with respect to the vehicle). Normally, this is done by processing the image data from the mobile device camera, and detecting the user's vehicle. A 3-dimensional (3D) model of the vehicle is loaded onto the mobile device, and a comparison of the captured image frames is searched by comparison of the 3D model. There are many factors that can cause the image processing to fail.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
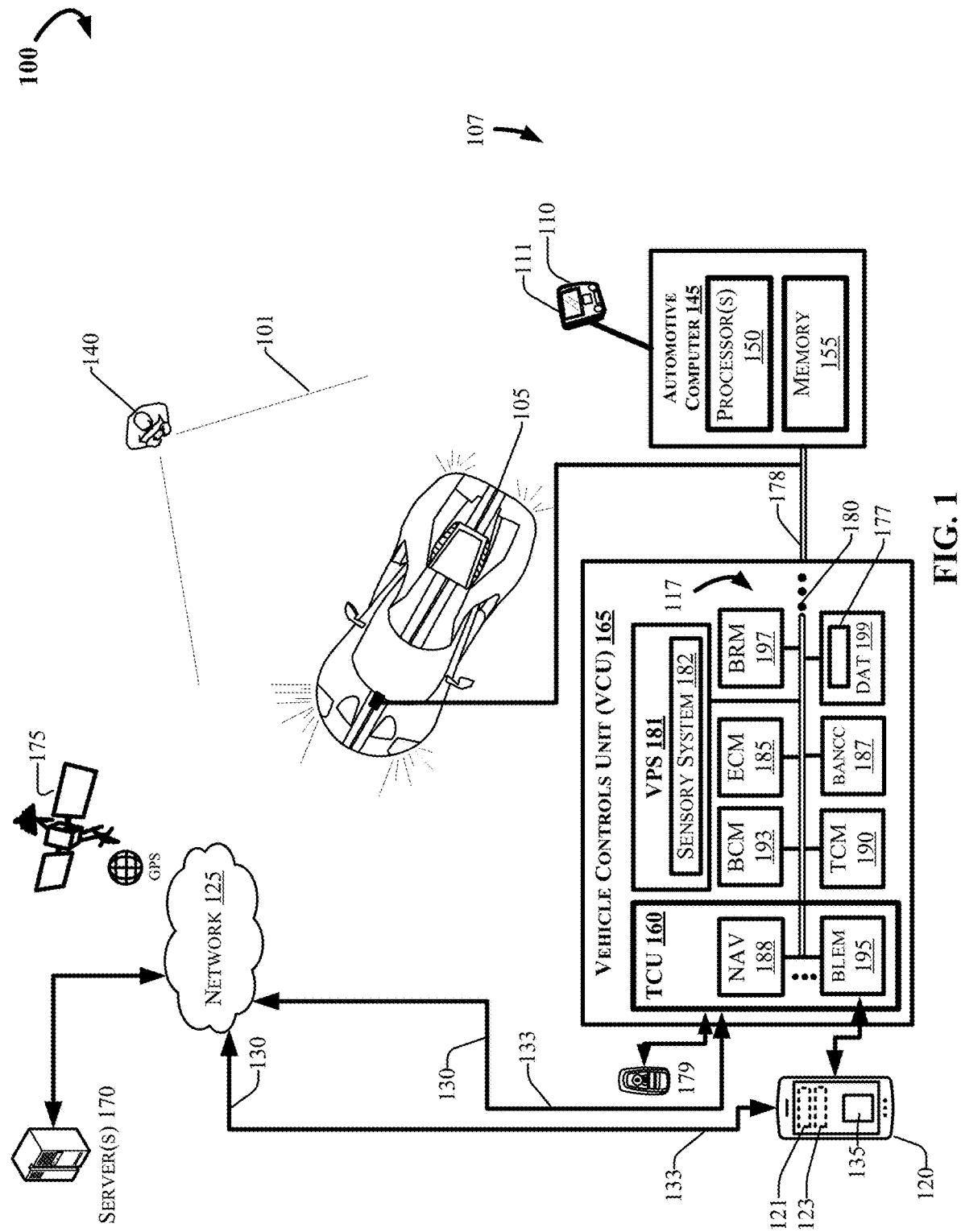
FIG. 1 depicts an example computing environment in which techniques and structures for providing the systems and methods disclosed herein may be implemented.

The systems and methods disclosed herein are configured and/or programmed to detects whether a user is pointing the back of their mobile device towards a vehicle in remote parking assist operation without using the mobile device camera for purposes of optical tethering. Instead of utilizing the mobile device camera sensors, the disclosed system may rely on a precise mobile device-to-vehicle localization, which is currently offered as a standard sensor in many mobile devices.

In one or more embodiments, the system may determine a heading estimate for the vehicle (either by a direct magnetometer measurement or a GPS and odometry estimate). The precise mobile device-to-vehicle localization system may include Ultra-Wideband (UWB) technology, or other technologies such as Low-Frequency (LF, which is used in many key fobs) may be used for mobile device to vehicle localization. UWB is part of the Car Connectivity Consortium (CCC) standard and may be included on any vehicle with Mobile device-as-a-Key or RePA.

In one or more embodiments, a user opens the RePA (or ReDAT) app on a mobile device and selects the vehicle they would like to remote operate using the system. The mobile device automatically connects to the vehicle over Bluetooth Low Energy (BLE) and UWB.

In one or more embodiments, the vehicle precisely determines the relative position of the mobile device, either in cartesian or polar coordinates. This is achieved by pure trilateration of multiple UWB anchor Time-of-Flight (ToF) distance measurements, distance measurement from a single UWB anchor+BLE Angle of Arrival, or another technology.

The vehicle may detect its own absolute heading. This can be achieved one of two ways: directly, via a magnetic sensor, or indirectly, by using known methods of tracking the change in global positioning system (GPS) position over time, fused with odometry information (such as, for example, steering wheel angle, wheel speed sensor, etc.).

In one or more embodiments, the mobile device collects an update from its onboard 3-axis magnetic sensor and its onboard 3-axis accelerometer. This will be later used by the vehicle to detect the direction that the back of the mobile device is facing, in an absolute coordinate frame. The mobile device may transmit sensory information and press status of an HMI button to the vehicle.

Responsive to receiving the information from the mobile device, the vehicle first checks that the mobile device is oriented approximately in the correct plane. The vehicle may determine that the mobile device back is not facing the ground or the sky. The vehicle then computes the relative bearing angle from the mobile device to the vehicle.

According to one or more embodiments, for display purposes only, the vehicle may transmit a calculated relative bearing to the mobile device. The mobile device can use this to indicate to the user which direction they need to turn the mobile device in order to allow vehicle motion. The indicator may be an arrow that moves in real time to always point to the vehicle, or other animation or icon. If the vehicle detects that the back of the mobile device is facing the ground or the sky (straight up or straight now), the engagement condition is false. If the relative bearing is greater than a threshold, the engagement condition is false. Ideally, the relative bearing from the mobile device to vehicle should be 0, meaning the mobile device is pointed directly at the vehicle.

According to one or more embodiments, if the user is not pressing the "go" button on the mobile device, the engagement condition is false. Any time the engagement condition is false, the vehicle may stop the remote parking procedure and come to a halt. Even if the mobile device is pointed directly at the vehicle, the user can always stop the vehicle by releasing this button.

If all the engagement criteria are satisfied, vehicle motion is allowed. Accordingly, responsive to determining that any of the engagement criteria are not satisfied, vehicle motion may be prohibited. (14) If the maneuver is still in progress, the system does a loop and updates all the sensor information to re-assess whether the engagement conditions are met. Otherwise, the maneuver is complete.

Aspects of the present disclosure may provide a convenient user interface that allows user control of a vehicle without reliance on a mobile device camera and data-intense image processing to determine that the mobile device is oriented correctly respective to a vehicle and the user is engaged with the parking procedure.

These and other advantages of the present disclosure are provided in greater detail herein.

Illustrative Embodiments

The disclosure will be described more fully hereinafter with reference to the accompanying drawings, in which example embodiments of the disclosure are shown, and not intended to be limiting.

FIG. 1 depicts an example computing environment 100 that can include a vehicle 105. The vehicle 105 may include an automotive computer 145, and a Vehicle Controls Unit (VCU) 165 that can include a plurality of electronic control units (ECUs) 117 disposed in communication with the automotive computer 145. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless connection(s) 130, and/or may connect with the vehicle 105 directly using near field communication (NFC) protocols, Bluetooth® protocols, Wi-Fi, Ultra-Wide Band (UWB), and other possible data connection and sharing techniques.

As illustrated in FIG. 1, the user 140 is proximate to the vehicle 105, and demonstrating attention to a remote park assist action using a hand-held mobile device 120. The vehicle 105 is disposed in a field of view 101 with respect to the mobile device 120. The mobile device 120 may be in communication with the vehicle 105 during the entire remote park assist operation.

The vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network. In some embodiments, the vehicle 105 may utilize a combination of GPS and Dead Reckoning responsive to determining that a threshold number of satellites are not recognized.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a performance vehicle, the vehicle 105 may take the form of another passenger or commercial automobile such as, for example, a car, a truck, a sport utility, a crossover vehicle, a van, a minivan, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in REV (PHEV) that includes a REV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that require no human input for operation, and may not include human operational driving controls.

According to embodiments of the present disclosure, the remote park assist system 107 may be configured and/or programmed to operate with a vehicle having a Level-3 or Level-4 autonomous vehicle controller. An example AV controller is described in greater detail with respect to FIG. 4. Accordingly, the remote park assist system 107 may provide some aspects of human control to the vehicle 105, when the vehicle is configured as an AV.

The mobile device 120 can include a memory 123 for storing program instructions associated with an application 135 that, when executed by a mobile device processor 121, performs aspects of the disclosed embodiments. The application (or "app") 135 may be part of the remote park assist system 107, or may provide information to the remote park assist system 107 and/or receive information from the remote park assist system 107.

In some aspects, the mobile device 120 may communicate with the vehicle 105 through the one or more wireless connection(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless connection(s) 130 are depicted in FIG. 1 as communicating via the one or more network(s) 125, and via one or more wireless connection(s) 133 that can be direct connection(s) between the vehicle 105 and the mobile device 120. The wireless connection(s) 133 may include various low-energy protocols including, for example, Bluetooth®, Bluetooth® Low-Energy (BLE®), UWB, Near Field Communication (NFC), or other protocols.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the remote park assist system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a remote park assist program code. The memory 155 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 178 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Body and Network Communication Controller (BANCC) 187, a Driver Assistances Technologies (DAT) controller 199, etc. The VCU 165 may further include and/or communicate with a Vehicle Perception System (VPS) 181, having connectivity with and/or control of one or more vehicle sensory system(s) 182. In some aspects, the VCU 165 may control operational aspects of the vehicle 105, and implement one or more instruction sets received from the application 135 operating on the mobile device 120, from one or more instruction sets stored in computer memory 155 of the automotive computer 145, including instructions operational as part of the remote park assist system 107.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a BLE® Module (BLEM) 195, a Wi-Fi transceiver, a UWB transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and BLE® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120, and/or one or more keys (which may include, for example, the fob 179).

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the remote park assist system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the remote park assist system 107, and/or via wireless signal inputs received via the wireless connection(s) 133 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Mobile device-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

The BANCC 187 can include sensory and processor functionality and hardware to facilitate user and device authentication, and provide occupant customizations and support that provide customized experiences for vehicle occupants. The BANCC 187 may connect with a Driver Assist Technologies (DAT) controller 199 configured and/or programmed to provide biometric authentication controls, including, for example, facial recognition, fingerprint recognition, voice recognition, and/or other information associated with characterization, identification, and/or verification for other human factors such as gait recognition, body heat signatures, eye tracking, etc.

The DAT controller 199 may provide Level-1 through Level-3 automated driving and driver assistance functionality that can include, for example, active parking assistance provided via a remote parking assist controller 177, trailer backup assistance, adaptive cruise control, lane keeping, and/or driver status monitoring, among other features. The DAT controller 199 may also provide aspects of user and environmental inputs usable for user authentication. Authentication features may include, for example, biometric authentication and recognition.

The DAT controller 199 can obtain input information via the sensory system(s) 182, which may include sensors disposed on the vehicle interior and/or exterior (sensors not shown in FIG. 1). The DAT controller 199 may receive the sensor information associated with driver functions, vehicle functions, and environmental inputs, and other information. The DAT controller 199 may characterize the sensor information for identification of biometric markers stored in a secure biometric data vault (not shown in FIG. 1) onboard the vehicle 105 and/or via the server(s) 170.

In other aspects, the DAT controller 199 may also be configured and/or programmed to control Level-1 and/or Level-2 driver assistance when the vehicle 105 includes Level-1 or Level-2 autonomous vehicle driving features. The DAT controller 199 may connect with and/or include a Vehicle Perception System (VPS) 181, which may include internal and external sensory systems (collectively referred to as sensory system(s) 181). The vehicle sensory system(s) 182 may be configured and/or programmed to obtain sensor data usable for biometric authentication, and for performing driver assistances operations such as, for example, active parking, trailer backup assistances, adaptive cruise control and lane keeping, driver status monitoring, and/or other features.

The computing system architecture of the automotive computer 145, VCU 165, and/or the remote park assist system 107 may omit certain computing modules. It should be readily understood that the computing environment depicted in FIG. 1 is an example of a possible implementation according to the present disclosure, and thus, it should not be considered limiting or exclusive.

The automotive computer 145 may connect with an infotainment system 110 that may provide an interface for the navigation and NAV receiver 188, and the remote park assist system 107. The infotainment system 110 may include a touchscreen interface portion 111, and may include voice recognition features, biometric identification capabilities that can identify users based on facial recognition, voice recognition, fingerprint identification, or other biological identification means. In other aspects, the infotainment system 110 may provide user identification using mobile device pairing techniques (e.g., connecting with the mobile device 120, a Personal Identification Number (PIN)) code, a password, passphrase, or other identifying means.

Figure 2:
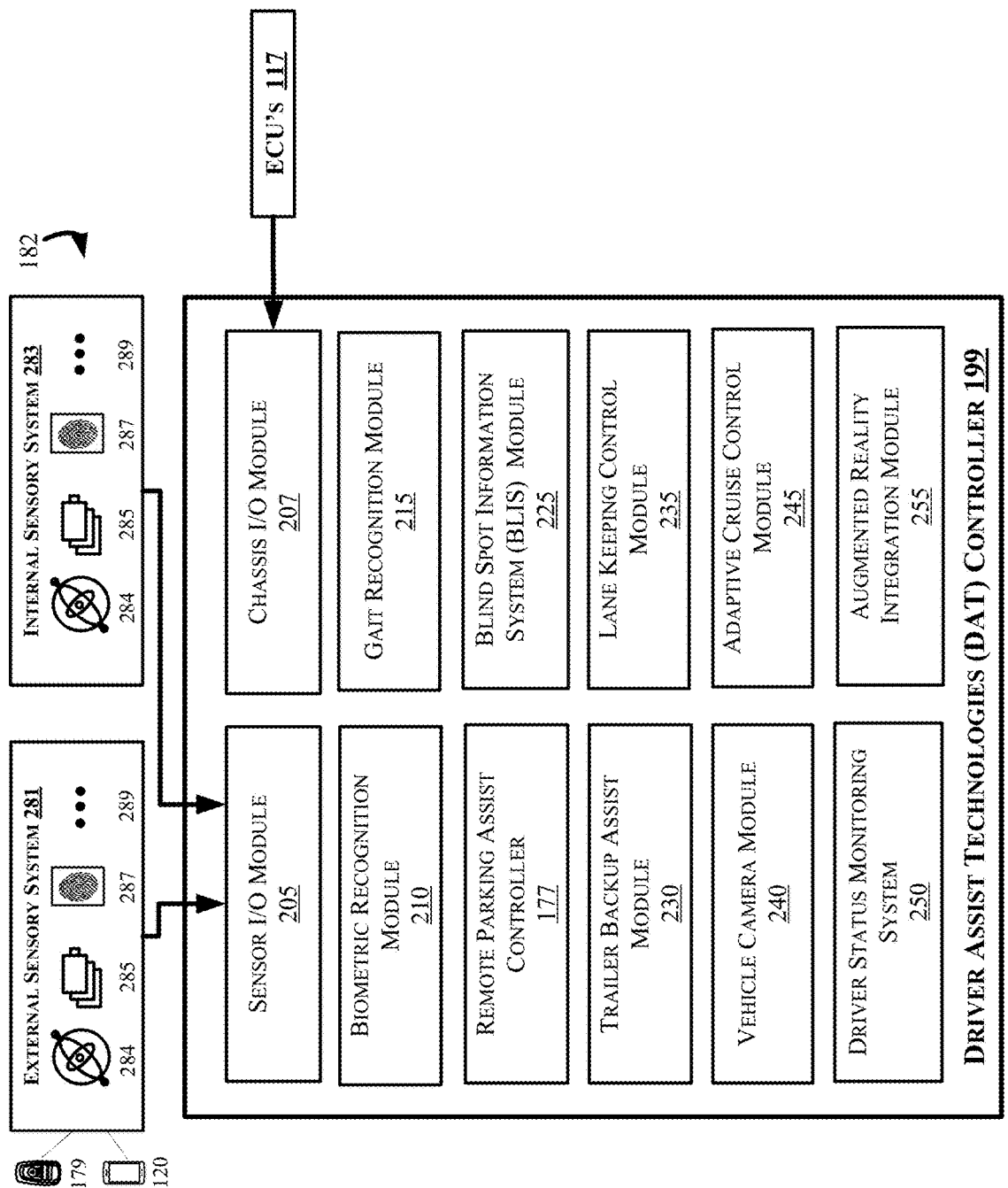
FIG. 2 is a driver assist technologies controller in accordance with the present disclosure.

FIG. 2 depicts an example DAT controller 199, in accordance with an embodiment. As explained in prior figures, the DAT controller 199 may provide automated driving and driver assistance functionality and may provide aspects of user and environmental assistance. The DAT controller 199 may facilitate user authentication, such as biometric authentication that can include face recognition fingerprint recognition, voice recognition, gait recognition, and other unique and non-unique biometric aspects. The DAT controller 199 may further provide vehicle monitoring, and multimedia integration with driving assistances.

In one example embodiment, the DAT controller 199 may include a sensor I/O module 205, a chassis I/O module 207, a chassis I/O module 207, a Biometric Recognition Module (BRM) 210, a gait recognition module 215, a remote parking assist controller 177, a blind spot information system (BLIS) module 225, a trailer backup assist module 230, a lane keeping control module 235, a vehicle camera module 240, an adaptive cruise control module 245, a driver status monitoring system 250, and an augmented reality integration module 255, among other systems. It should be appreciated that the functional schematic depicted in FIG. 2 is provided as an overview of functional capabilities for the DAT controller 199. In some embodiments, the vehicle 105 may include more or fewer modules and control systems.

The DAT controller 199 can obtain input information via the sensory system(s) 182, which may include the external sensory system 281 and the internal sensory system 283 sensors disposed on the vehicle 105 interior and/or exterior, and via the chassis I/O module 207, which may be in communication with the ECUs 117. The external sensory system 281 and the internal sensory system 283 may include one or more inertial measurement units (IMUs) 284, one or more camera(s) 285, fingerprint sensor(s) 287, and/or other sensory devices 289.

The IMU(s) 284 may include a gyroscope, an accelerometer, a magnetometer, or other inertial measurement device. The fingerprint sensor(s) 287 can include any number of sensor devices configured and/or programmed to obtain fingerprint information. The fingerprint sensor(s) 287 and/or the IMU(s) 284 may also be integrated with and/or communicate with a passive key device, such as, for example, the mobile device 120 and/or the fob 179. The fingerprint sensor(s) 287 and/or the IMU(s) 284 may also (or alternatively) be disposed on a vehicle exterior space such as the engine compartment (not shown in FIG. 2), door panel (not shown in FIG. 2), etc. In other aspects, when included with the internal sensory system 283, the IMU(s) 284 may be integrated in one or more modules disposed within the vehicle cabin or on another vehicle interior surface.

The DAT controller 199 may receive the sensor information associated with driver functions, and environmental inputs, and other information from the sensory system(s) 182.

In other aspects, the DAT controller 199 may also be configured and/or programmed to control Level-1 and/or Level-2 driver assistance when the vehicle 105 includes Level-1 or Level-2 autonomous vehicle driving features. The DAT controller 199 may connect with and/or include a Vehicle Perception System (VPS) 181, which may include internal and external sensory systems (collectively referred to as vehicle sensory systems 181). The vehicle sensory system(s) 182 may be configured and/or programmed to obtain sensor data usable for biometric authentication, and for performing driver assistances operations such as, for example, active parking, trailer backup assistances, adaptive cruise control and lane keeping, driver status monitoring, and/or other features.

Figure 3:
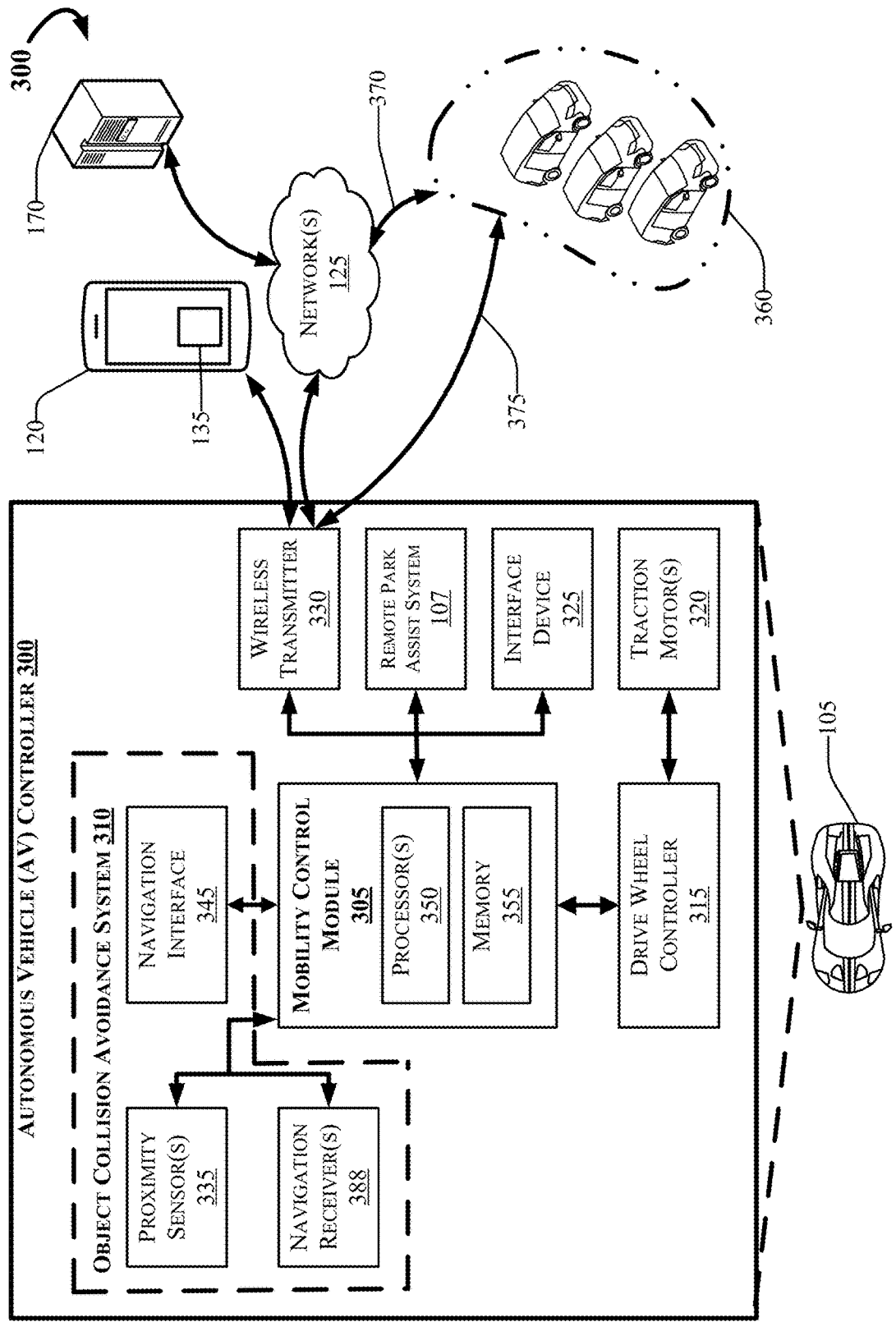
FIG. 3 depicts a block diagram of an example control system for an autonomous vehicle in accordance with the present disclosure.

FIG. 3 depicts a block diagram of an example autonomous vehicle controller 300, in accordance with embodiments. The AV controller 300 may include an object collision avoidance system 310 disposed in communication with a mobility control module 305. The object collision avoidance system 310 may perform object detection, navigation, and provide navigational interactive control features. The mobility control module 305 may be configured and/or programmed to receive data from the object collision avoidance system 310 to provide vehicle control.

The AV controller 300 may be disposed in communication with and/or include the remote park assist system 107, in accordance with embodiments described herein. The mobility control module 305 may include one or more processor(s) 350, and a memory 355. The processor(s) 350 may be one or more commercially available general-purpose processor(s), such as a processor from the Intel® or ARM® architecture families. In some aspects, the mobility control module 305 may be implemented in a system on a chip (SoC) configuration, to include other system components such as RAM, flash storage and I/O buses. Alternatively, mobility control module 305 can be implemented using purpose-built integrated circuits, or any other suitable technology now known or later developed.

The memory 355 may include executable instructions implementing the basic functionality the AV controller 300 and a database of locations in geographic area. For example, the mobility control module 305 may connect with a drive wheel controller 315. The drive wheel controller 315 may communicate signals to one or more traction motor(s) 320, which may embody a drive mechanisms such as a brushless direct current (DC) motor, or another traction motor technology. The mobility control module 305 may cause the drive wheel controller 315 to transmit motive signals to the traction motor(s) 320 to the vehicle 05.

The AV controller 400 may further include an interface device 325 having input and output surfaces (not shown in FIG. 4) for providing interactive access to users onboard the AV (e.g., the vehicle 105). For example, the interface device 325 may include a touch screen interface surface configured and/or programmed to provide operational information such as power consumption information, battery health, battery level, etc. In some embodiments, the interface device 325 may further provide control features for controlling other motive aspects of the vehicle 105, such as breaking, acceleration, etc.

The interface device 325 may also communicate information to and from the navigation interface 345, and/or be integral with the navigation interface 345 such that they share a common touch screen interface. The interface device 325, either alone or in conjunction with the navigation interface 345, may provide control prompts and receive operator inputs.

The vehicle 105 may be further configured and/or programmed to communicate information with other devices and vehicles using a wireless transmitter 330. The wireless transmitter 330 may communicate with one or more other vehicles, and/or a central routing computer (e.g., the server(s) 170 as described with respect to FIG. 1) using a wireless communication network such as, for example, the network(s) 125. The network(s) 125 may be the Internet, a private network, a cellular device provider's data network, or other network infrastructure such as, for example, a vehicle-to-vehicle communication network. An example of a vehicle-to-vehicle communication protocol may be, for example, a dedicated short-range communication (DSRC) protocol.

The vehicle 105 may communicate with one or more other vehicles in a fleet of vehicles 360 in various ways, including via an indirect communication channel 370 using the network(s) 125, and/or via any number of direct communication channels 375.

The object collision avoidance system 310 may include one or more proximity sensor(s) 335, one or more navigation receiver(s) 388, and a navigation interface 345 through which users of the AV controller 300 may determine relative bearing angles from the mobile device 120 to the vehicle 105, evaluate absolute headings for the vehicle 105, etc. The object collision avoidance system 310 may communicate control signals to a mobile device application (e.g., the application(s) 135 described with respect to FIG. 1).

The object collision avoidance system 310 may provide route management and communication between one or more other vehicles in the fleet, and to the operator of the vehicle. The object collision avoidance system 310 may receive operator input via the navigation interface 325 to receive user selections indicative of an actuation of a HMI engagement while operating the vehicle remotely using the system remote park assist system 107. The mobility control module 305 may receive navigational data from the navigation receiver(s) 488 and the proximity sensor(s) 335, determine a navigational path from a first location to a second location, and provide instructions to the drive wheel controller 315 for autonomous, semi-autonomous, and/or manual operation.

The navigation receiver(s) 388 can include one or more of a global positioning system (GPS) receiver, and/or other related satellite navigation systems such as the global navigation satellite system (GLNSS), Galileo, or other similar systems known in the art of autonomous vehicle operation. Additionally, the navigation receiver(s) 388 can be configured and/or programmed to receive locally based navigation cues to aid in precise navigation through space-restricted areas, such as, for example, in a crowded street, and/or in a distributed beacon environment. When deployed in conjunction with a distributed beacon network (not shown in FIG. 3), locally based navigation cues can include communication with one or more purpose-built location beacons (not shown in FIG. 3) placed throughout a geographic area. The navigation cues may enable an increased Level—of navigation precision and provide specific indicators for locations of various points of interest. In other aspects, the navigation receiver(s) 388 may include one or more navigation transceivers (not shown in FIG. 3) for communication with mobile network infrastructure for cell tower triangulation and use of known-location Wi-Fi hotspots. Any location technology now known or later developed that can provide a high precision location (e.g., preferably within a linear foot) can be useful as part of navigation receiver(s) 388.

The proximity sensor(s) 335 may work in connection with the navigation receiver(s) 388 to provide situational awareness to mobility control module 305 for autonomous navigation. For example, the proximity sensors may include one or more Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The proximity sensor(s) 335 may alert the mobility control module 305 to the presence of sensed obstacles, and provide trajectory information to the mobility control module 305, where the trajectory information is indicative of moving objects or people that may interact with the vehicle 105. The trajectory information may include one or more of a relative distance, a trajectory, a speed, a size approximation, a weight approximation, and/or other information that may indicate physical characteristics of a physical object or person.

The mobility control module 305 may be configured and/or programmed to aggregate information from navigation receiver(s) 388, such as current position and speed, along with sensed obstacles from the proximity sensor(s) 335, and interpret the aggregated information to compute an efficient safe path towards a destination such that the vehicle 105 avoids collisions. Sensed obstacles can include other vehicles, pedestrians, animals, structures, curbs, and other random objects. In some implementations the proximity sensor(s) 335 may be configured and/or programmed to determine the lateral dimensions of the path upon which the vehicle 105 is traveling, e.g., determining relative distance from the side of a sidewalk or curb, to help aid mobility control module 305 in maintaining precise navigation on a particular path.

The navigation interface 325 may allow a rider to enter identity information, logon credentials, a target destination. In addition, the navigation interface 325 can provide information associated with various points of interest, such as historical or reference facts. For example, where point of interest is a shopping center, navigation interface 325 can present information such as various stores and attractions that are located in the shopping center, hours of operation, etc. Similarly, where point of interest is a recreation center or sports center, navigation interface 325 can present information on upcoming events, ticket availability and prices, and similar such data. Such data is typically stored in a database file either located as part of memory in mobility control module 305, or possibly in navigation interface 325, if configured with a separate database.

Figure 4:
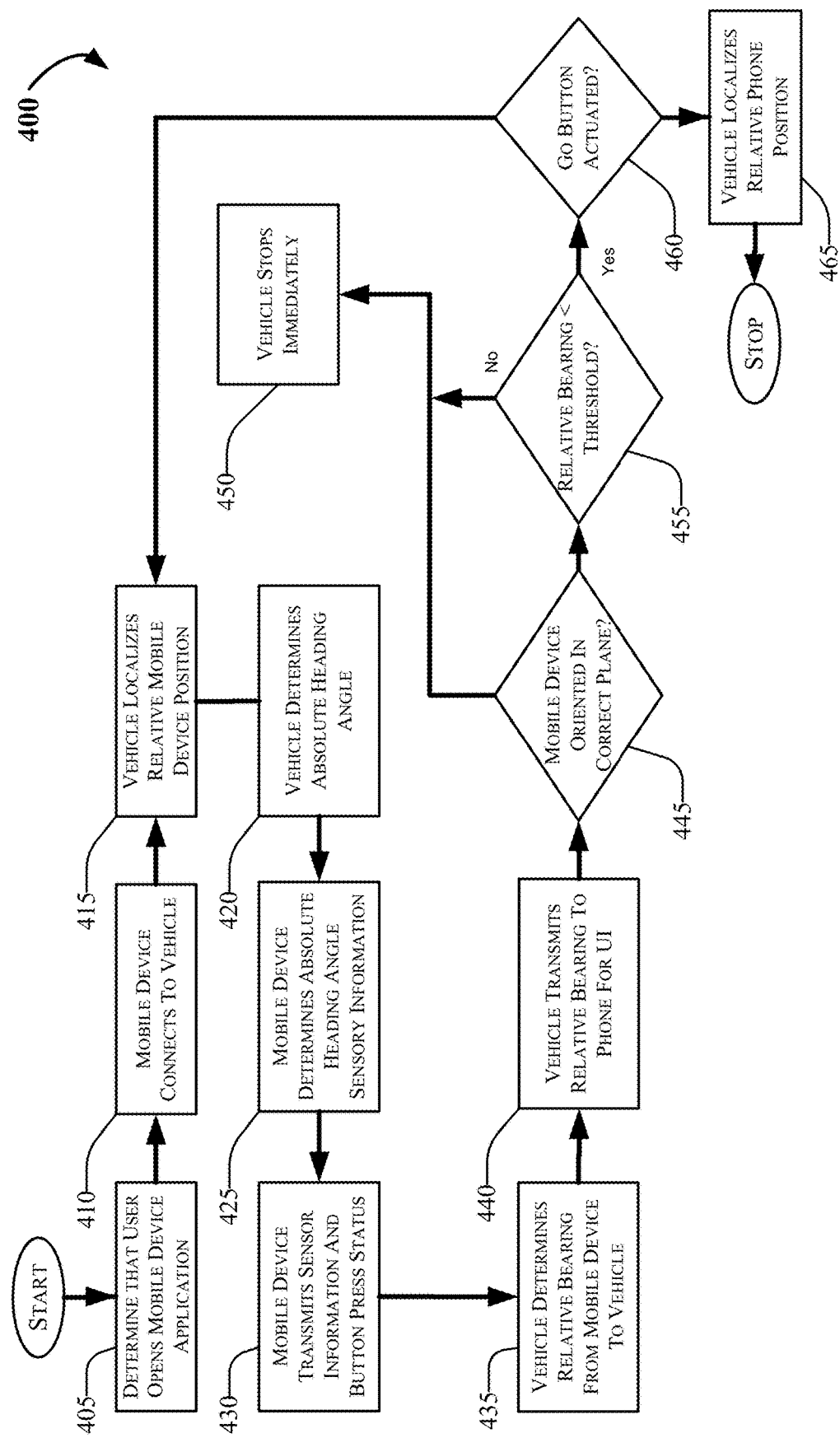
FIG. 4 is a flow diagram illustrating a systematic logic for operating the system of FIG. 1 in accordance with embodiments the present disclosure.

FIG. 4 is a flow diagram illustrating a systematic logic 500 for operating the system of FIG. 1 in accordance with embodiments the present disclosure. Responsive to an initialization (Start), at step 405 the system 107 may determine that the user 140 opens the application 135.

Figure 5:
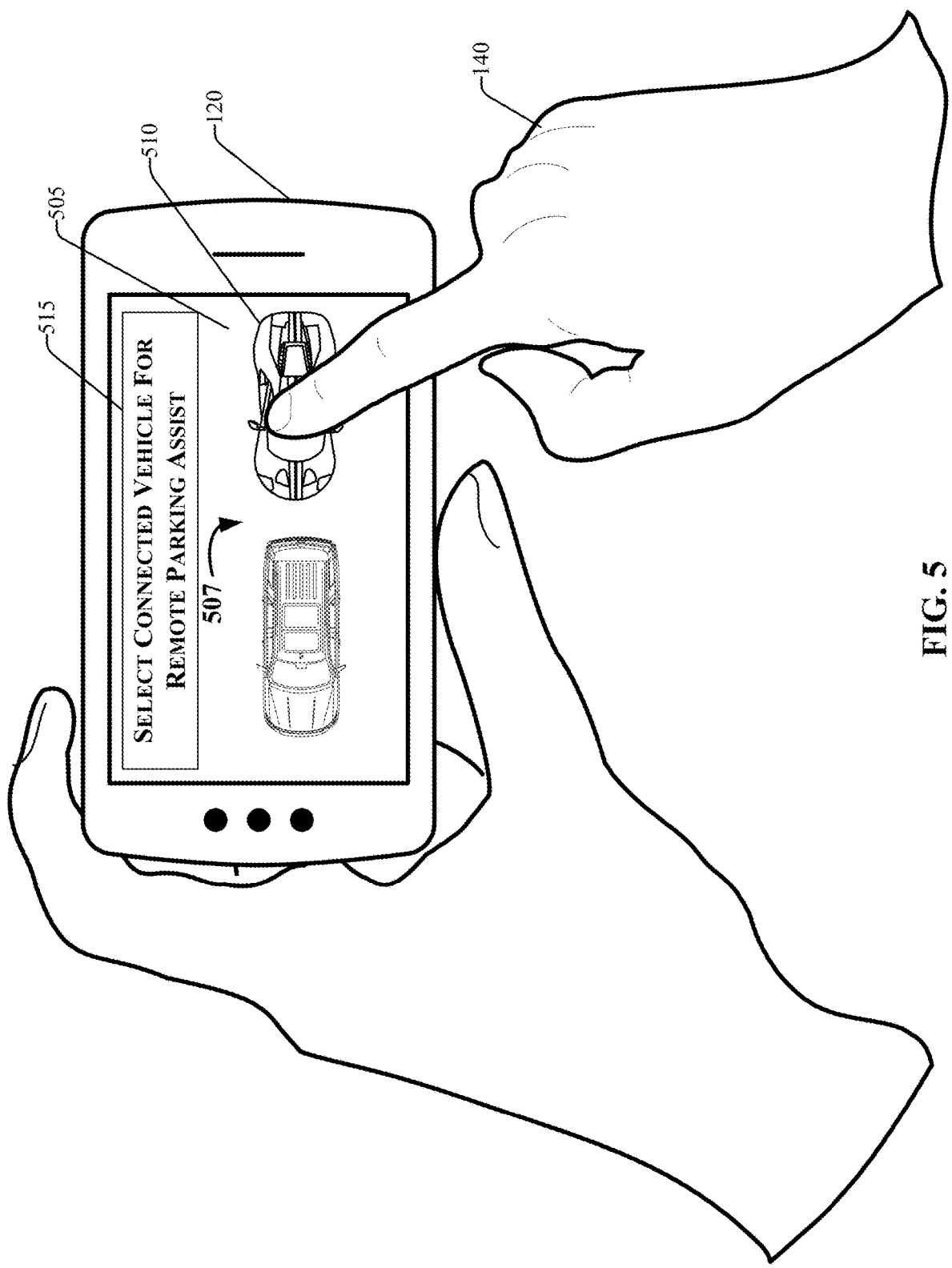
FIG. 5 illustrates a user receiving an instruction via a mobile in accordance with embodiments of the present disclosure.

With reference to FIG. 5, the user 140 is illustrated performing a control action that includes selecting an icon or image 510 of the vehicle to be controlled using the system 107. In the example of FIG. 5, the user 140 has controlled or owns two vehicles represented by an icon group 507.

Figure 6:
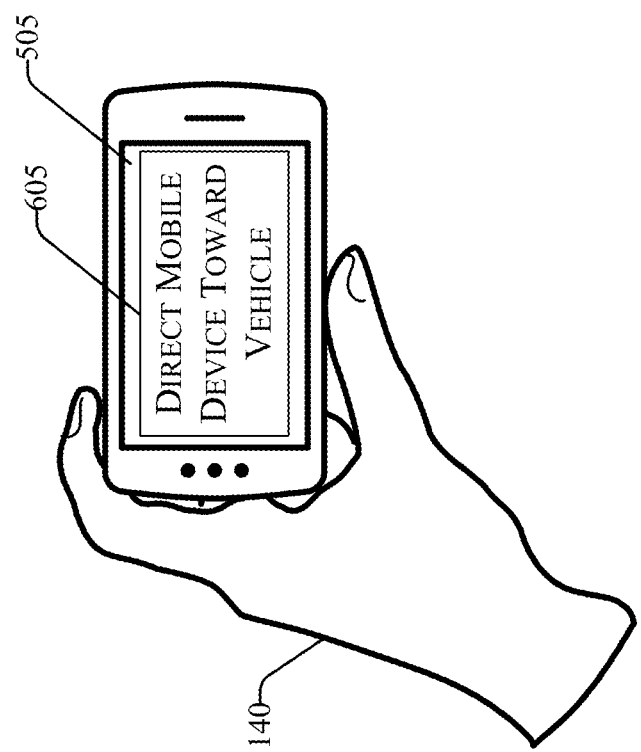
FIG. 6 illustrates a user performing a control action using a mobile device in accordance with embodiments of the present disclosure.

FIG. 6 illustrates the mobile device 120 after the initialization step and selection of the connected vehicle. The mobile device 120 may the HMI 505 to output an instruction 605 indicative of a user action to orient the mobile device 120. For example, the instruction 605 can, when followed, cause the user 140 to direct the mobile device 120 to a functional orientation with respect to the vehicle 105. One example instruction 605, "Direct Mobile Device Toward Vehicle" is illustrated as an example.

With reference to FIG. 4, at step 410, the mobile device 120 may connect to the vehicle 105 (step 410). Responsive to the user vehicle selection, the mobile device 120 may connect to the vehicle 105 over BLE and/or UWB, among other suitable technologies.

Figure 7:
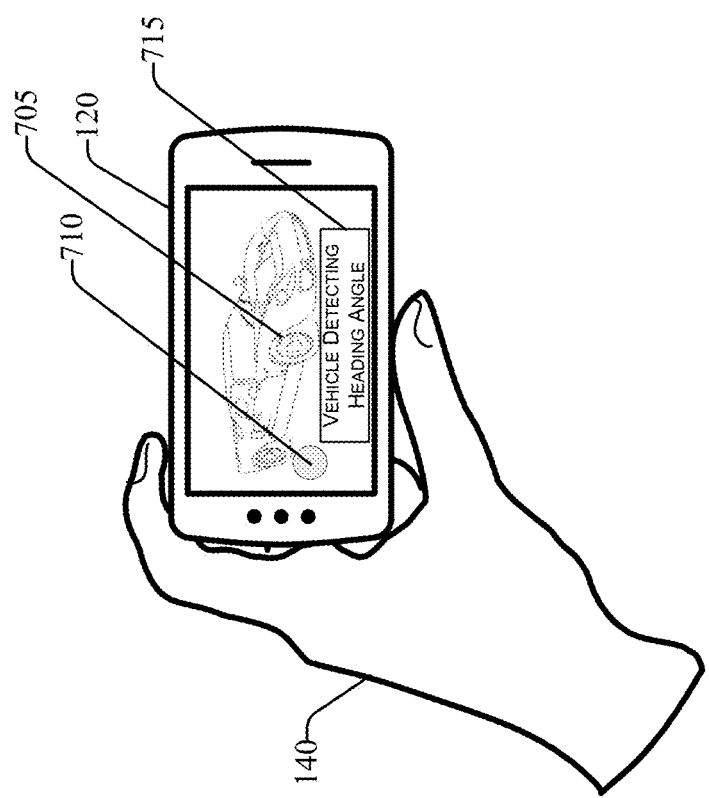
FIG. 7 illustrates the user receiving instructions for operating the system of FIG. 1 using the mobile device in accordance with embodiments of the present disclosure.
Figure 8:
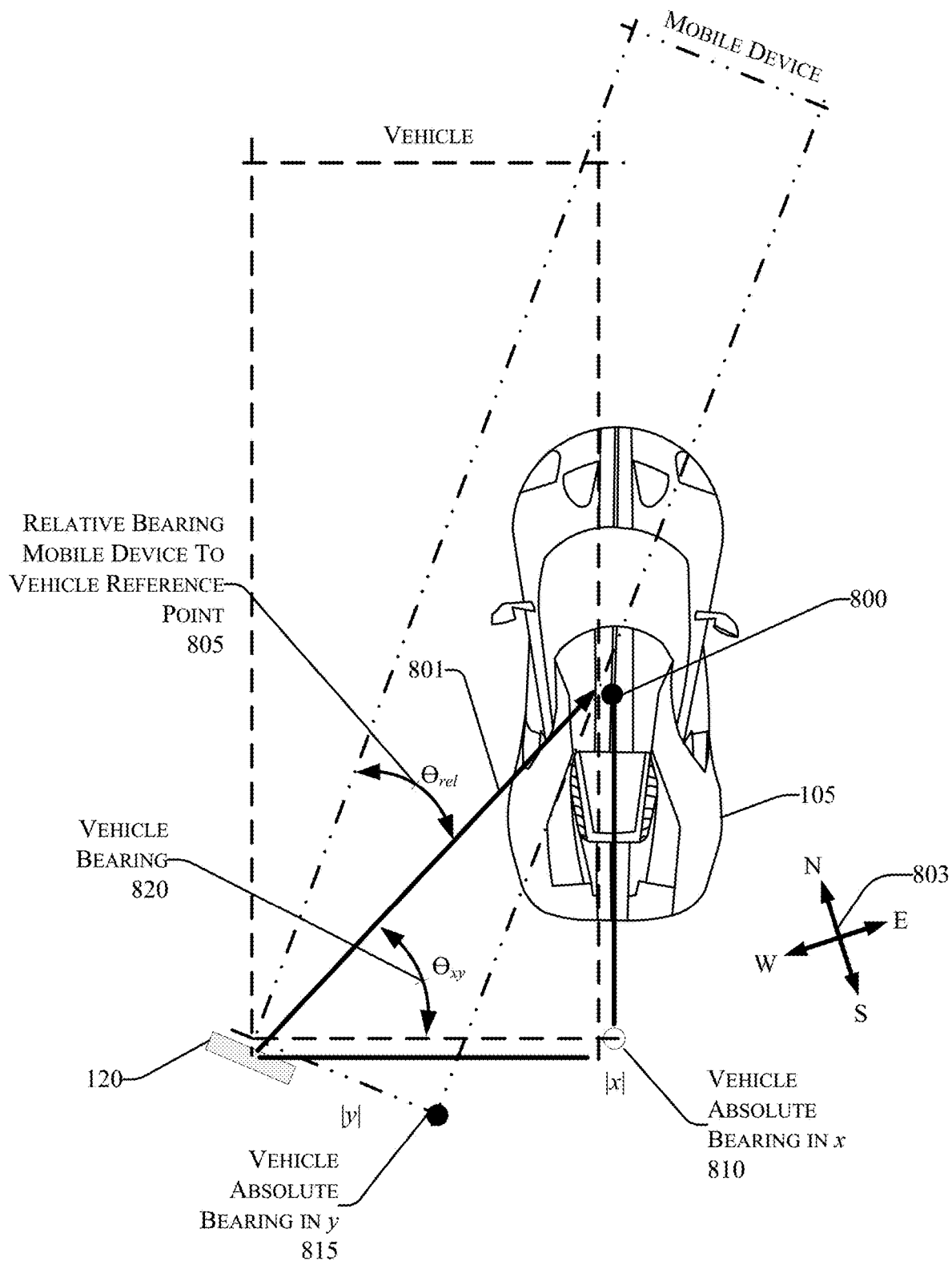
FIG. 8 illustrates aspects of determining a relative bearing from the vehicle to the mobile device in accordance with embodiments of the present disclosure.

At step 415 the vehicle 105, and more particularly, the processor(s) 150 may localize the vehicle 105 position relative to the mobile device 120. FIGS. 7 and 8, discussed hereafter, illustrate aspects of localizing the vehicle position. FIG. 7 illustrates the mobile device 120 generating another output using the mobile device HMI. The figure shows an image of the vehicle 105 with a user-readable message 715 "Vehicle Detecting Heading Angle." Responsive to the user actuating the application 135 on the mobile device 120, the mobile device may output the user-readable message 715 to alert the user 140 that the system localization has begun.

With reference given to FIG. 8, localizing the vehicle 105 position relative to the mobile device 120 is referred to in part as relative bearing 805, and is not immediately known based on vehicle-based computation. The localization value describes a relative position of the direction mobile device 120 as the front screen or face of the mobile device faces the vehicle 105. As the relative bearing from mobile device 120 to vehicle 105 increases, the greater deviation or angle there is from a vector normal to the mobile device face to a central vehicle reference point 800. Stated another way, the greater the relative bearing 805, the greater the angle from the center of the mobile device screen (e.g., the mobile device points more and more away from the vehicle as the bearing angle increases). Ideally, relative bearing from mobile device 120 to vehicle 105 is at or about 0 degrees, indicating that a normal vector to the mobile device screen is pointed directly at the theoretical center reference point of the vehicle.

With reference again to FIG. 4, at step 420 the vehicle determines absolute heading and angle. FIG. 8 illustrates aspects of determining a relative bearing $\theta_{rel}$ 805 from the vehicle 105 to the mobile device 120, in accordance with embodiments of the present disclosure. $\theta_{rel}$ 805 is a measurement of the relative vehicle bearing. The relative bearing $\theta_{rel}$ 805 provides a relative bearing from mobile device 120 to the vehicle 105.

Referring again to FIG. 4, at step 425, a vehicle ToF responder (not shown in FIG. 5 or in FIG. 8) may determine the location of the mobile device 120.

At initialization of the mobile device application (135 as shown on FIG. 1), only the vehicle bearing angle 820 from vehicle 105 to the mobile device 120 is known, which may be obtained using UWB. Determining the relative bearing 805 from the mobile device 120 to the central vehicle reference point 800 includes two bodies of information: first, the heading 801 of the mobile device 120 must be known, and second, the heading of the vehicle 105 (vehicle heading not shown in FIG. 8) must be known. This is this is because the vehicle controller(s) (e.g., the VCU 165 as shown in FIG. 1) onboard the vehicle 105 change position with respect to time. Determining a vehicle heading estimate may be determined by the vehicle independently using a compass (magnetic sensor), or using things like GNSS, and wheel speed, steering wheel angle, other factors, or a combination of vehicle telemetry and a compass device (e.g., one or more devices of the VCU 165). If the roles were able to be reversed (e.g., the mobile device 120 computes a relative vehicle position), there would be no further need for the absolute heading information described in the following FIGS. 8 and 9.

The relative bearing angle is therefore a primary quantity of interest for a vehicle-based localization solution. However, the values given by UWB only include an absolute bearing of the vehicle 105 in the x dimension 810, in they dimension 815, and the consequent vehicle bearing $\theta_{xy}$ 820 indicative of the bearing angle of the vehicle 105 from the mobile device 120. The relative bearing, $\theta_{rel}$ 805 cannot be given directly by UWB with the mobile device as the ToF initiator and vehicle as ToF responder since the heading angle of the mobile device is unknown. Accordingly, the system 107 may determine the relative bearing 805.

The vehicle 105 may determine a relative position of the mobile device 120 with respect to the vehicle 105, either in cartesian coordinates 803 or polar coordinates (not shown in FIG. 8). At the vehicle side, the processor(s) 150 may determine a relative position either by pure trilateration of multiple UWB anchor Time-of-Flight (ToF) distance measurements, (e.g., by utilizing an x-y offset with respect to vehicle position) or by distance measurement from a single UWB anchor+BLE Angle of Arrival. It should be appreciated that digital key architecture only allows the mobile device to act as a ToF initiator, and thus the mobile device 120 is not capable of determining the location of the vehicle 105. This is due to tethering security concerns, as it is advantageous to determine a relative bearing from the vehicle side to maintain a secured connection for remote vehicle control.

In some aspects, the vehicle 105 detects its own absolute heading. The processor can do this in at least two ways: First, the vehicle 105 may determine absolute heading via a magnetic sensor or other sensory device associated with the VPS 181. In other aspects, the vehicle may determine absolute heading GPS tracking via the NAV receiver 188 (as shown in FIG. 1). For example, the vehicle 105 may determine a change in GNSS position over time. The tracking data may be fused with odometry information (steering wheel angle, wheel speed sensor, etc.) retrieved from the VPS and/or the TCU 160.

Figure 9:
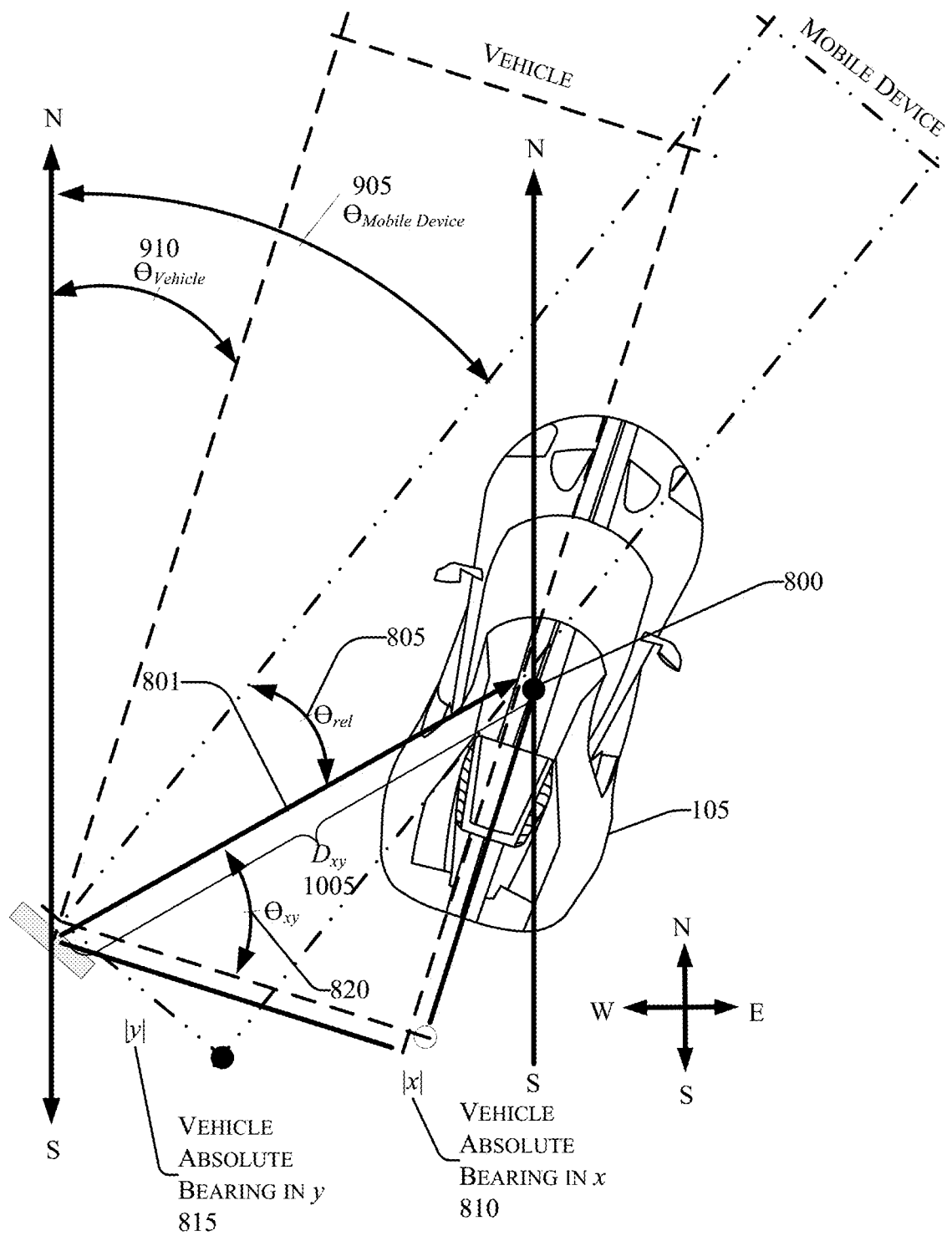
FIG. 9 shows aspects of determining a relative bearing of a mobile device with respect to a vehicle in accordance with embodiments of the present disclosure.

Referring again to FIG. 4, at step 420 the vehicle 105 may determine an absolute heading angle. FIG. 9 illustrates one method for determining the absolute heading angle. FIG. 9 shows aspects of determining a relative bearing of a mobile device with respect to a vehicle in accordance with embodiments of the present disclosure. FIG. 9 also shows an absolute heading angle of the mobile device 120 ($\ominus_{Mobile\ Device}$ 1005), and an absolute heading angle of the vehicle 910 ($\ominus_{vehicle}$). In some aspects, the mobile device 120 may send sensor information and HMI button press status to the vehicle 105. For functional reasons, it is important that the vehicle 105 performs these calculations to determine an absolute heading angle of the mobile device 120 $\ominus_{Mobile\ Device}$ 905 and an absolute heading angle of the vehicle 910 ($\ominus_{Vehicle}$).

The vehicle may determine the relative bearing, $\theta_{rel}$, from the mobile device to the vehicle 105. Note that this is a different value than the relative bearing from vehicle to mobile device, since relative bearing is a function of the heading of the reference device (mobile device), but not the heading of the target device (vehicle). The computation is as follows: $90°=\theta_p-v+\theta_{rel}+\theta_{xy}$, such that $\theta_{rel}=90°-\theta_{xy}-(\theta_p-\theta_v)$.

Referring again to FIG. 4, at step 425 the mobile device 120 may determine absolute heading angle sensory information. These steps were described in detail with respect to FIGS. 8 and 9. The absolute heading angle sensory information may include mobile device heading information.

Figure 10:
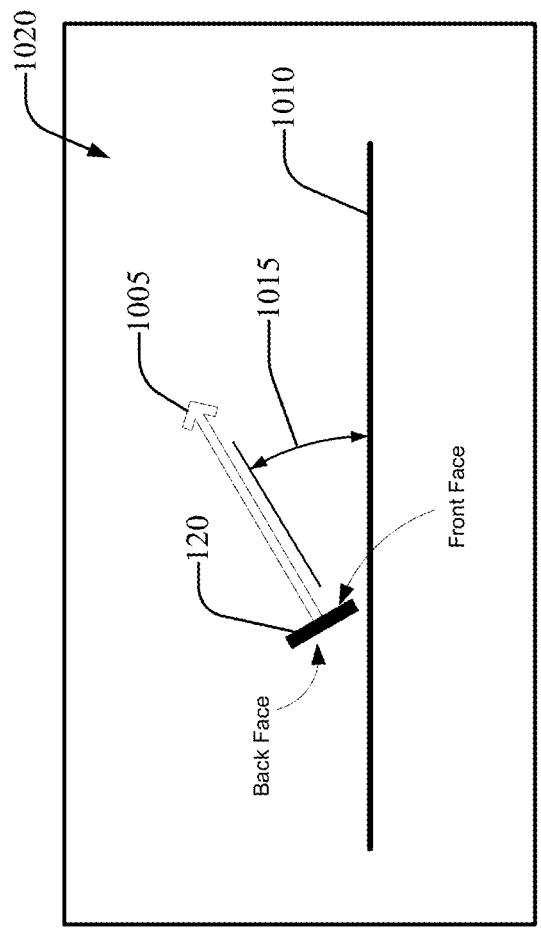
FIG. 10 illustrates characteristics of a mobile device oriented while used with the system of FIG. 1 in accordance with the present disclosure.

FIG. 10 illustrates a side view of the mobile device 120 pointed with a mobile device heading 1005 toward the sky and likely at too high of an angle to properly to show active user engagement as illustrated. The heading angle sensory information may be indicative of a mobile device heading 1005 (and the absolute heading angle 1015). The vehicle 105 may check that the mobile device 120 is oriented approximately in the correct plane, as demonstrated by the mobile device heading 1005. The mobile device heading 1005 describes an absolute heading angle 1015 from the mobile device heading 1005 to the surface of the ground 1010. For example, the back face or front face of the mobile device 120 is not facing the ground 1010, or the sky 1020.

Figure 11:
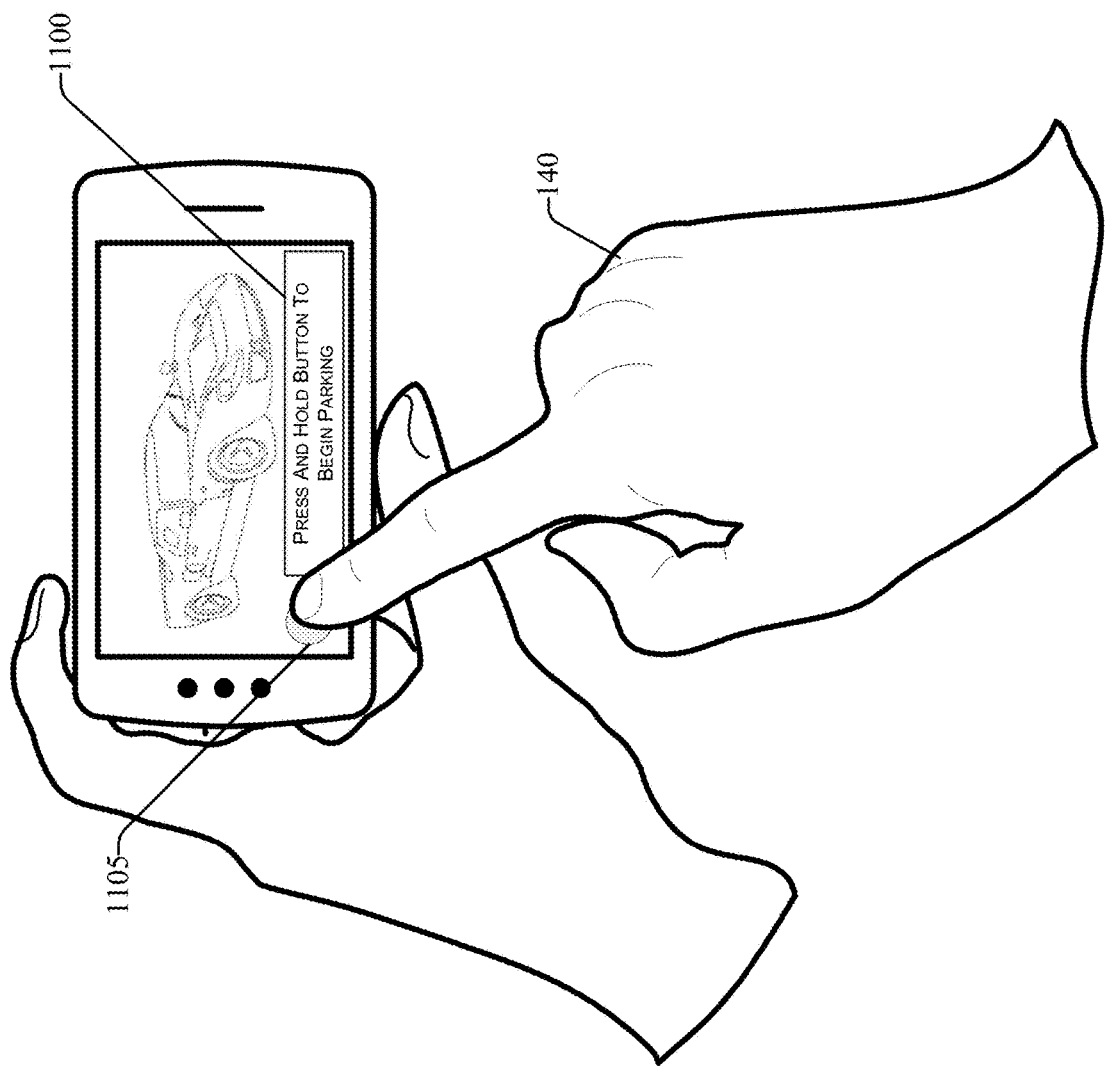
FIG. 11 illustrates the user performing a control actions using a mobile device in accordance with embodiments of the present disclosure.
Figure 12:
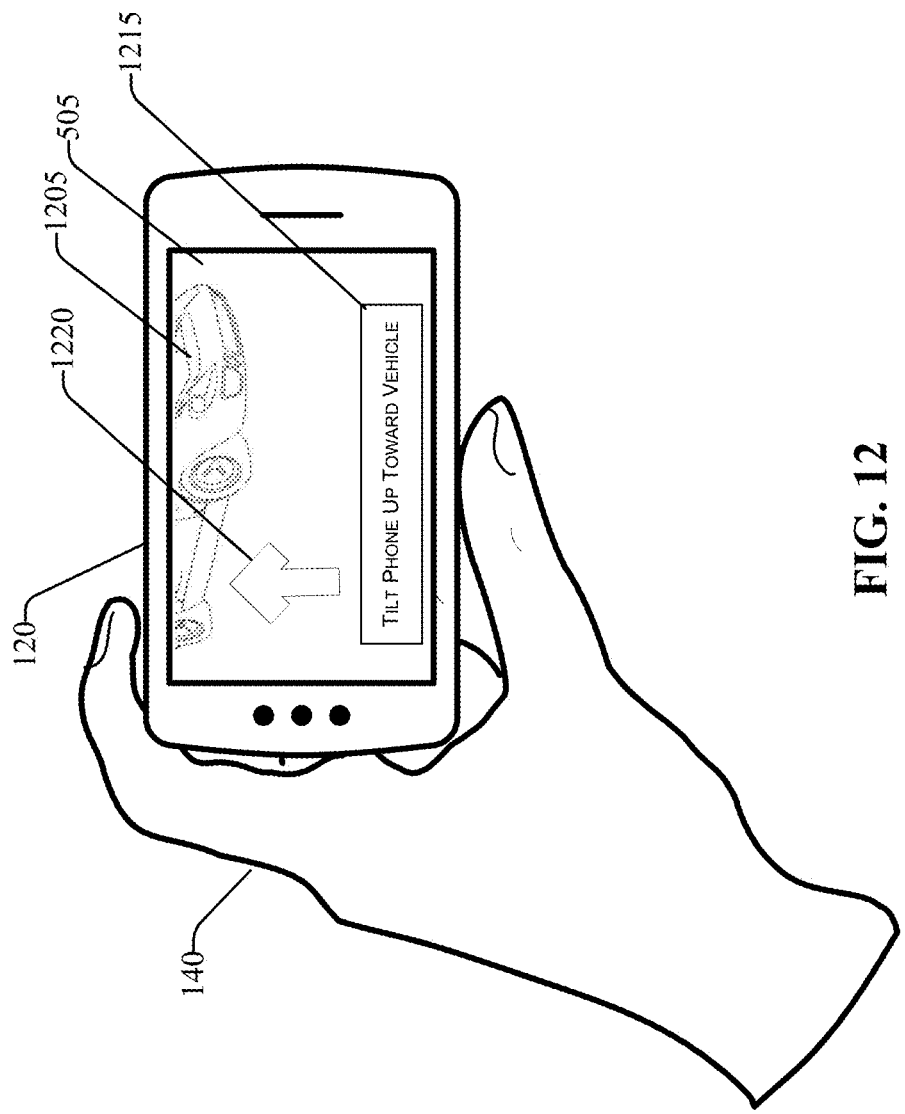
FIG. 12 illustrates the user performing a control actions using a mobile device in accordance with embodiments of the present disclosure.

At step 430, the mobile device 120 may transmit sensor information and a button press status indicative that the user 140 is actively actuating a Human Machine Interface (HMI) element indicative of user attention to the remote parking maneuver. FIG. 12 illustrates the user 140 receiving an instruction 1200 via the mobile device 120 for operating the system 107, in accordance with embodiments of the present disclosure. As illustrated in FIG. 11, the instructions may cause the user 140 to press and hold an HMI element such as a button 1105, or other user engagement mechanism. The instruction may include, for example, instructions for pressing and holding a button 1105. The system 107 may cause output of a user message 1100 indicating one or more actions needed for the remote park assist operation.

Referring again to FIG. 4, at step 435, the vehicle 105 determines relative bearing from the mobile device 120 to the vehicle 105. The processor(s) 150 (shown in FIG. 1) may determine a relative bearing either by pure trilateration of multiple UWB anchor Time-of-Flight (ToF) distance measurements, (e.g., by utilizing an x-y offset with respect to vehicle position) or by distance measurement from a single UWB anchor+BLE Angle of Arrival.

At step 440, the vehicle 105 transmits relative bearing to the mobile device 120 for user interface (UI).

At step 445, the vehicle determines that mobile device 120 is oriented in a correct plane. FIG. 12 illustrates a vehicle image 1205 appearing on an HMI 505. The vehicle image 1205 shown may exceed a minimum threshold for relative bearing with respect to the mobile device 120, because the vehicle image 1205 does not indicate that the mobile device 120 has a bearing that directs to an optimal location that indicates full user attention to the remote park operation. Accordingly, the HMI 505 may output an messages 1215, and/or an animation or icon indicative of a user instruction for orienting the mobile device 1220. The mobile device 120 may be pointed in a direction that leads away from a co-planar (with respect to the ground) view of the vehicle 105 (shown as the vehicle image 1205 in FIG. 12). The HMI 505 may output one or more messages 1215 such as, for example "Tilt Phone Up Toward Vehicle".

Referring again to FIG. 4, at step 450, responsive to determining that the mobile device is not oriented correctly, the vehicle 105 stops immediately. The vehicle may disengage one or more drive systems and/or apply vehicle braking to cease vehicle movement.

At step 455, the vehicle determines if the relative bearing is less than a threshold value for vehicle bearing. Responsive to determining that the mobile device 120 is not oriented correctly, the vehicle 105 stops immediately. Responsive to determining that the relative bearing is within the minimum threshold, at step 460 the vehicle determines if a go button is actuated on the mobile device HMI.

Figure 13:
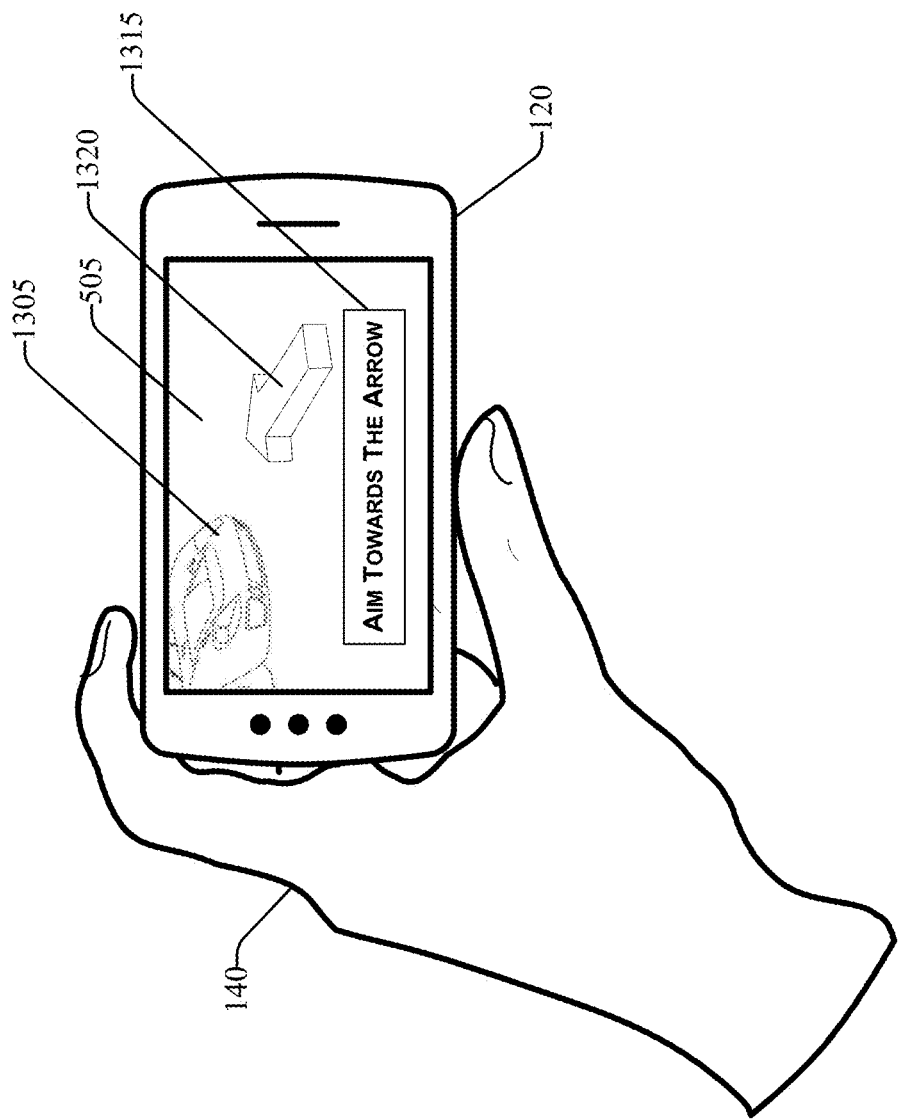
FIG. 13 illustrates the user performing a control actions using a mobile device in accordance with embodiments of the present disclosure.

In some aspects, the vehicle 105 may determine that the mobile device 120 is not oriented having a relative bearing within the minimum threshold. A minimum threshold may be, for example, 5 degrees, 10 degrees, 25 degrees, etc. FIG. 13 illustrates a vehicle image 1305 appearing in an upper left portion of the HMI 505, which may be an indication that the relative bearing is outside of a minimum threshold for relative bearing with respect to the mobile device 120. Accordingly, an HMI 505 may output an message 1315, and/or an animation or icon indicative of a user instruction for orienting the mobile device 120.

To determine this step, the vehicle 105 may transmit a calculated relative bearing to the mobile device 120. The mobile device 120 can use this to indicate to the user 140 which direction they need to turn the mobile device in order to allow vehicle motion (e.g., the animation or icon 1320). The animation or icon may be, for example, an arrow or other indicator that can moves in real time to always point to the vehicle image 1305 (and thus, the actual vehicle 105).

In one aspect, a color of the arrow may be managed by the vehicle and/or the mobile device 120 as a function of whether the vehicle 105 is within view of the user 140 and a camera sensor of the mobile device 120. For example, if the vehicle 105 is behind the user 140 within some tolerance of error (e.g., 50%, 75%, etc.), the HMI 505 may output a red arrow pointing toward the user 140. The message 1315 may indicate, "Turn around to face vehicle"

If the vehicle 105 is to the side of the user 140 and out of view of the mobile device 120 within some tolerance of error, a yellow arrow may be displayed in the direction of the vehicle 105.

If the vehicle 105 is within view of the mobile device within some tolerance of error, a green arrow may be displayed in the direction of the vehicle.

Referring again to FIG. 7, an HMI button 710 is shown. The HMI button may be pressed by a user while orienting the mobile device 120 to have a view of the vehicle 105. The system 107 may determine whether the user 140 is pressing the HMI button 710 while the vehicle is within a threshold bearing angle respective to the mobile device 120. Responsive to determining that the go button is actuated, at step 465 the vehicle localizes the vehicle position relative to the mobile device position.

Figure 14:
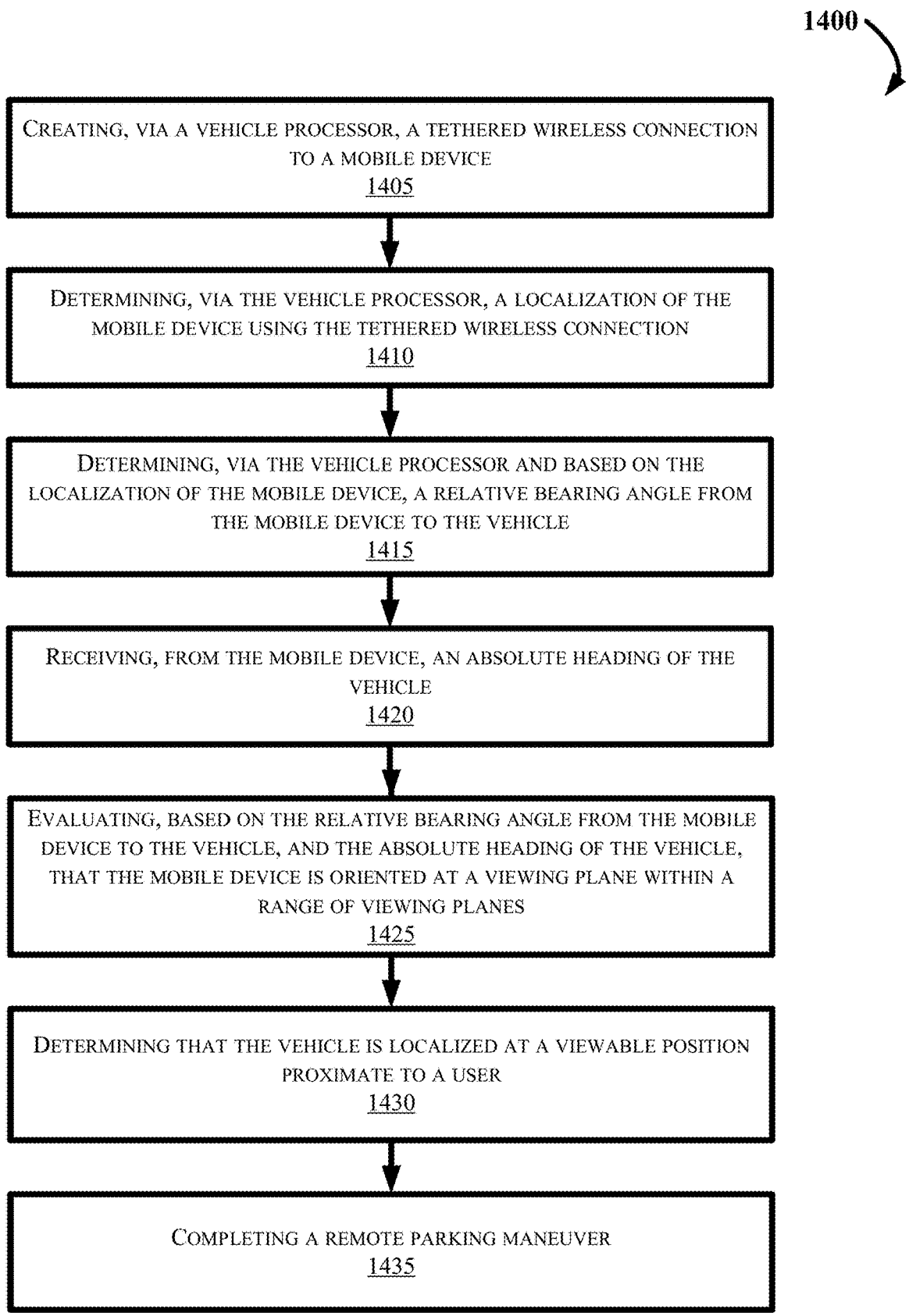
FIG. 14 depicts a flow diagram of an example method for controlling a vehicle using the remote park assist system of FIG. 1 in accordance with the present disclosure.

FIG. 14 is a flow diagram of an example method 1400 for controlling a vehicle using the remote park assist system 107 of FIG. 1, according to the present disclosure. FIG. 15 may be described with continued reference to prior figures, including FIGS. 1-13. The following process is exemplary and not confined to the steps described hereafter. Moreover, alternative embodiments may include more or less steps that are shown or described herein, and may include these steps in a different order than the order described in the following example embodiments.

Referring now to FIG. 14, at step 1405, the method 1400 may commence with determining, via a vehicle processor, a localization of a mobile device using a tethered wireless connection between the mobile device and the vehicle.

At step 1410, the method 1400 may further include determining, via the vehicle processor, an absolute heading of the vehicle.

At step 1415, the method 1400 may further include receiving, from the mobile device, an absolute heading of the vehicle and an absolute heading of the mobile device.

At step 1420, the method 1400 may further include determining, via the vehicle processor, based on the localization of the mobile device, the absolute heading of the mobile device, and the absolute heading of the vehicle, a relative bearing angle from the mobile device to the vehicle. This step may include receiving sensory information from the vehicle perception system and/or the telematics processing unit.

At step 1425, the method 1400 may further include completing a remote parking maneuver based on the relative bearing angle from the mobile device to the vehicle. This step may further include evaluating, based on the relative bearing angle from the mobile device to the vehicle, and the absolute heading of the vehicle, that the mobile device is oriented at a viewing plane within a range of viewing planes. This step may include generating, via the vehicle processor, an HMI output command executable to cause the mobile device to display a user message indicating a camera positioning instruction; and transmitting the HMI output control command to the mobile device. In some aspects, the camera positioning instruction comprises a relative bearing arrow indicating a target mobile device mobile device position associated with a viewing plane within the range of viewing planes.

In some aspects, this step includes determining, via the vehicle processor, using the tethered wireless connection to the mobile device, that the vehicle is localized at a viewable position proximate to a user and the mobile device. This step may include generating, via the vehicle processor, an HMI output command executable to cause the mobile device to display a user message indicating a camera positioning instruction, and transmitting the HMI output control command to the mobile device. In some aspects, the camera positioning instruction may include a relative bearing arrow indicating a target mobile device mobile device position associated with a viewing plane within the range of viewing planes. The relative bearing arrow may change colors according to the relative bearing of the mobile device. For example, the relative bearing arrow may be generated with a first color indicating an acceptable viewing plane within the range of viewing planes, and a second color indicating an unacceptable viewing plane that is not within the range of viewing planes.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a vehicle, comprising:
   determining, via a vehicle processor, a localization of a mobile device using a tethered wireless connection between the mobile device and the vehicle;
   determining, via the vehicle processor, an absolute heading of the vehicle;
   receiving, from the mobile device, an absolute heading of the mobile device;
   determining, via the vehicle processor, based on the localization of the mobile device, the absolute heading of the mobile device, and the absolute heading of the vehicle, a relative bearing angle from the mobile device to the vehicle; and
   completing a remote parking maneuver based on the relative bearing angle from the mobile device to the vehicle.

2. The method according to claim 1, further comprising:
   determining that a user is actuating a Human Machine Interface (HMI) element indicative of user attention to the remote parking maneuver; and
   determining, via the vehicle processor, that the vehicle is localized at a viewable position proximate to the user.

3. The method according to claim 2, further comprising:
   generating, via the vehicle processor, an HMI output control command executable to cause the mobile device to display a user message indicating a camera positioning instruction; and
   transmitting the HMI output control command to the mobile device.

4. The method according to claim 3, wherein the camera positioning instruction comprises a relative bearing arrow indicating a target mobile device position associated with a viewing plane within a range of viewing planes.

5. The method according to claim 3, wherein the user message comprises:
   a first color indicating an acceptable viewing plane within the range of viewing planes, and
   a second color indicating an unacceptable viewing plane that is not within the range of viewing planes.

6. The method according to claim 3, further comprising:
   determining, via the vehicle processor, that the vehicle is within view of the mobile device; and
   completing the remote parking maneuver responsive to determining that the vehicle is within view of the mobile device.

7. The method according to claim 3, wherein the user message comprises:
   a written message indicating a user orientation instruction.

8. A system for a vehicle, comprising:
   a vehicle processor; and
   a memory for storing executable instructions, the vehicle processor programmed to execute the instructions to:
     determine, via the vehicle processor, a localization of a mobile device using a tethered wireless connection between the mobile device and the vehicle;
     determine an absolute heading of the vehicle;
     receive, from the mobile device, an absolute heading of the mobile device;
     determine, via the vehicle processor, based on the localization of the mobile device, the absolute heading of the mobile device, and the absolute heading of the vehicle, a relative bearing angle from the mobile device to the vehicle; and
     complete a remote parking maneuver based on the relative bearing angle from the mobile device to the vehicle.

9. The system according to claim 8, wherein the vehicle processor is further programmed to:
   determine that a user is actuating a Human Machine Interface (HMI) element indicative of user attention to the remote parking maneuver; and
   determine that the vehicle is localized at a viewable position proximate to the user.

10. The system according to claim 9, wherein the vehicle processor is further programmed to execute the instructions to:
    generate an HMI output control command executable to cause the mobile device to display a user message indicating a camera positioning instruction; and
    transmit the HMI output control command to the mobile device.

11. The system according to claim 10, wherein the camera positioning instruction comprises a relative bearing arrow indicating a target mobile device position associated with a viewing plane within a range of viewing planes.

12. The system according to claim 11, wherein the user message comprises:
    a first color indicating an acceptable viewing plane within the range of viewing planes, and
    a second color indicating an unacceptable viewing plane that is not within the range of viewing planes.

13. The system according to claim 11, wherein the vehicle processor is further programmed to execute the instructions to:
    determine that the vehicle is within view of the mobile device; and
    complete the remote parking maneuver responsive to determining that the vehicle is within view of the mobile device.

14. The system according to claim 11, wherein the user message comprises: a written message indicating a user orientation instruction.

15. A non-transitory computer-readable storage medium in a vehicle controller, the non-transitory computer-readable storage medium having instructions stored thereupon which, when executed by a processor, cause the vehicle controller to:
    determine a localization of a mobile device using a tethered wireless connection between the mobile device and a vehicle;
    determine an absolute heading of the vehicle;
    receive, from the mobile device, an absolute heading of the mobile device;
    determine, based on the localization of the mobile device, the absolute heading of the mobile device, and the absolute heading of the vehicle, a relative bearing angle from the mobile device to the vehicle; and
    complete a remote parking maneuver based on the relative bearing angle from the mobile device to the vehicle.

16. The non-transitory computer-readable storage medium according to claim 15, having further instructions stored thereupon to cause the vehicle controller to:
    determine that a user is actuating a Human Machine Interface (HMI) element indicative of user attention to the remote parking maneuver; and
    determine that the vehicle is localized at a viewable position proximate to the user.

17. The non-transitory computer-readable storage medium according to claim 15, having further instructions stored thereupon to cause the vehicle controller to:

generate an HMI output control command executable to cause the mobile device to display a user message indicating a camera positioning instruction; and transmit the HMI output control command to the mobile device.

18. The non-transitory computer-readable storage medium according to claim 17, wherein the camera positioning instruction comprises aa relative bearing arrow indicating a target mobile device position associated with a viewing plane within a range of viewing planes.

19. The non-transitory computer-readable storage medium according to claim 17, having further instructions stored thereupon to:

determine that the vehicle is within view of the mobile device; and complete the remote parking maneuver responsive to determining that the vehicle is within view of the mobile device.

20. The non-transitory computer-readable storage medium according to claim 17, wherein the user message comprises:

a written message indicating a user orientation instruction.

\* \* \* \* \*